United States Patent [19]

Davenport

[11] Patent Number: 5,054,998
[45] Date of Patent: Oct. 8, 1991

[54] THRUST REVERSING SYSTEM FOR COUNTER ROTATING PROPELLERS

[75] Inventor: Franklyn J. Davenport, Bellevue, Wash.

[73] Assignee: The Boeing Company, Inc., Seattle, Wash.

[21] Appl. No.: 251,902

[22] Filed: Sep. 30, 1988

[51] Int. Cl.$^5$ .............................................. B64C 11/48
[52] U.S. Cl. ........................................ 416/1; 416/129; 244/69; 244/110 B
[58] Field of Search ................. 416/23, 120, 124, 126, 416/128, 129, 130, 170 R, 172, 1; 60/228, 268; 244/69, 110 B

[56] References Cited

U.S. PATENT DOCUMENTS

| | | | |
|---|---|---|---|
| 2,126,221 | 8/1938 | Sessums | 416/130 X |
| 2,216,013 | 9/1940 | Kenney | 416/127 X |
| 2,228,638 | 1/1941 | Mercier | 416/130 X |
| 2,455,239 | 11/1948 | Doussain | 416/127 X |
| 2,533,346 | 12/1950 | Brady et al. | 416/130 X |
| 2,584,115 | 2/1952 | Dinsmoor | 416/130 X |
| 2,607,430 | 8/1952 | Dean | 416/130 X |
| 2,672,115 | 3/1954 | Conover | 416/128 X |
| 2,674,407 | 4/1954 | Ostrognai | 416/127 X |
| 2,982,361 | 5/1961 | Rosen | 416/130 X |
| 3,646,834 | 3/1972 | Davis | 416/170 R X |
| 3,830,587 | 8/1974 | Shipes et al. | 416/130 X |
| 3,986,794 | 10/1976 | Korn | 416/127 X |
| 4,483,658 | 11/1984 | Levine | 416/130 |
| 4,486,146 | 12/1984 | Campion | 416/127 X |
| 4,621,978 | 11/1986 | Stuart | 416/130 X |

OTHER PUBLICATIONS

'Power Flow in a Differential', *Machine Design*, Apr. 8, 1976 Fred A. Shen, pp. 77–79.

*Primary Examiner*—Edward K. Look
*Assistant Examiner*—James A. Larson
*Attorney, Agent, or Firm*—Hughes & Multer

[57] ABSTRACT

A method of creating thrust reversal for an engine having counter-rotating forward and rear propeller blades. The forward blades are set at a positive angle of attack to produce an orderly flow of air toward the rear blades. The rear blades are set at a negative angle of attack to produce reverse thrust. The net effect is that the thrust produced by the rear blades overbalances that of the forward blades to produce net thrust reversal.

24 Claims, 3 Drawing Sheets

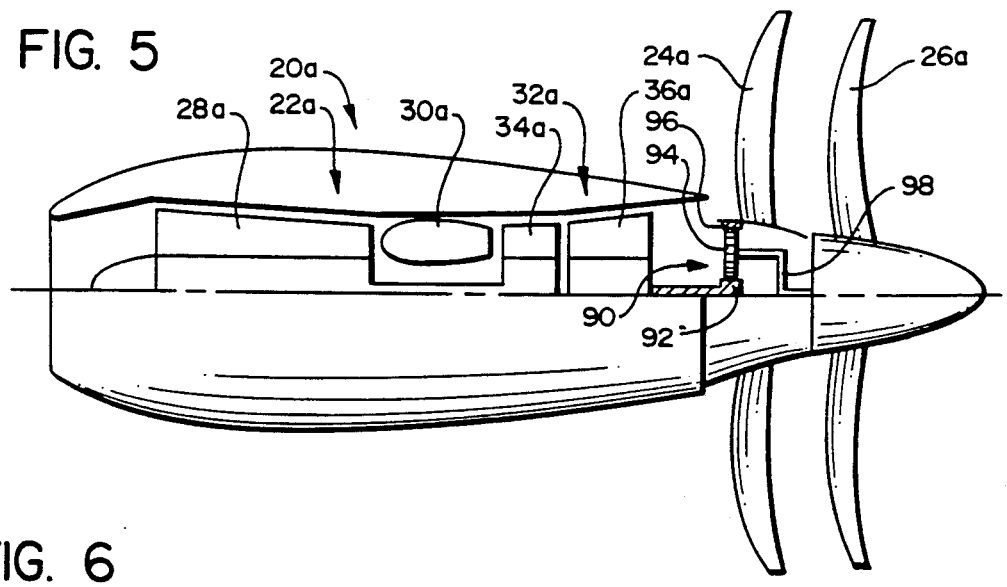
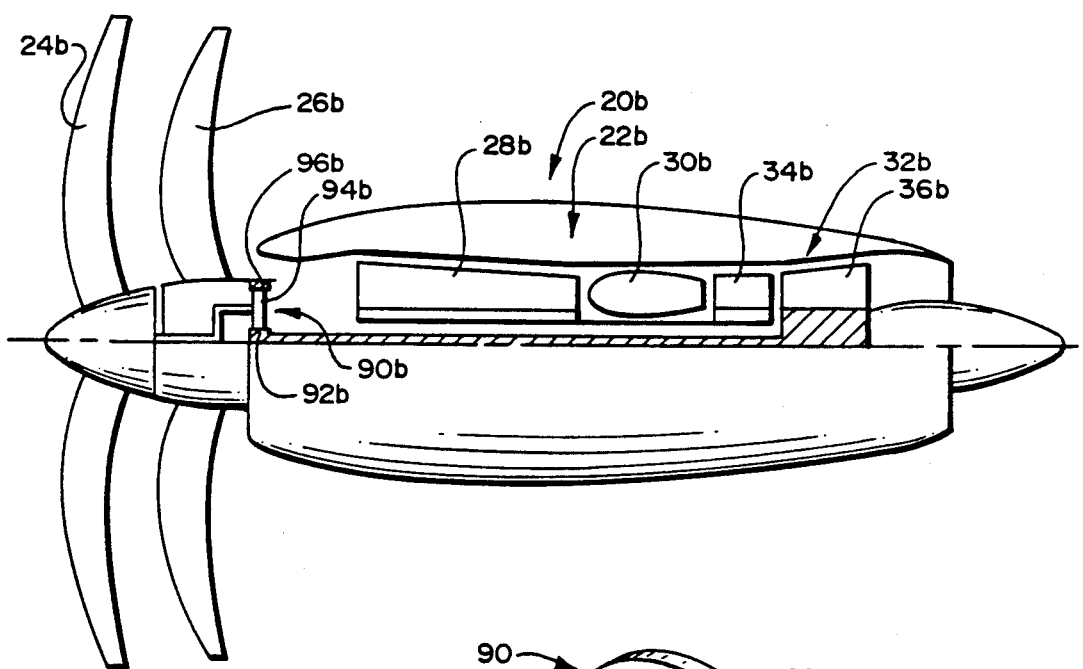
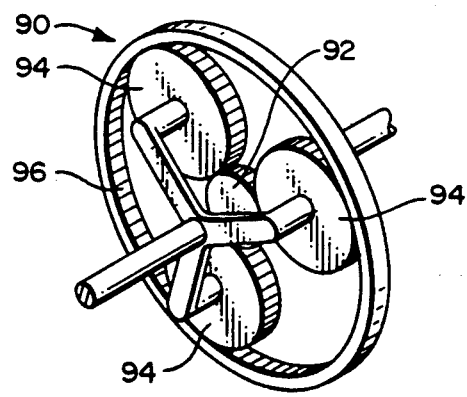

THRUST REVERSING SYSTEM FOR COUNTER ROTATING PROPELLERS

BACKGROUND OF THE INVENTION

1. Field of the Invention

The present invention relates to a system and method for creating thrust reversal by means of two sets of counter rotating propellers, and more particularly to such a system and method used where the propellers are driven from an engine, such as a free-turbine engine, where both of the propeller rotors should be run at roughly equal speed and positive power levels.

2. Background Art

One method of creating thrust reversal by means of variable pitch propeller blades is to change the pitch of each blade so that the angle of attack of the blade is such so as to create a reverse thrust. However, where there are counter-rotating propellers, with forward and rear sets of propeller blades being positioned closely adjacent to one another, the creating of reverse thrust by setting the propeller blades of the forward set at a negative angle has the effect of "blanking out" the air flow to the rear propeller blades. This compromises the ability of the rear set of propeller blades to absorb power.

This situation causes a problem in reversing the thrust of counter-rotating propellers where the design of the engine (and gearbox, if any) does not mechanically constrain the two rotors to turn at the same rpm (or the same ratio of rpms). Such designs are the most common and desirable, and include schemes in which each rotor is driven by the inner or outer portion of a counter-rotating statorless turbine (wherein the only connection between rotors is via the gas path), or in which a differential planetary gear box is used. (The kinematics of the latter will permit one rotor to slow down in a fixed relation to the speeding up of the other.) In either case, if the aerodynamic torques exerted by the two rotors on the passing air stream are not held to a fixed ratio to each other, the more lightly loaded rotor will accelerate. The more heavily loaded rotor (i.e., the one producing the greater thrust) will suffer performance degradation because overall engine power must be reduced to prevent overspeeding the lightly loaded rotor.

A search of the patent literature has disclosed a number of patents which deal with variable pitch propellers, devices which control the relative rates of rotation of propeller sets, and also thrust reversal by means of fan or propeller blades. It is believed that none of these are closely relevant to the problems addressed by the present invention and are not particularly relevant to the particular invention itself. However, these are being cited to ensure that there is a full disclosure of all possibly relevant prior art known to the inventor. These are as follows:

U.S. Pat. No. 2,126,221 (Sessums) shows a propeller unit for an aircraft where there are forward and rear propellers mounted to the same driveshaft. The forward propeller is set at a greater pitch and the rear propeller at a lesser pitch. During takeoff and climb, the forward propeller is disengaged from the drive shaft so that it rotates freely, while the rear propeller provides the thrust. At cruise, when the plane is traveling at a greater speed, the front propeller is cause to engage the drive shaft so that it now creates thrust. The purpose of this arrangement is to avoid the need of variable pitch propellers and yet enable the propeller unit to operate efficiently at the takeoff and climb mode, and also the cruise mode.

U.S. Pat. No. 2,216,013 (Kenney) shows a torque balancing mechanism to equalize the loads on the two shafts that drive counter rotating propellers. If the load on one propeller is greater than the load on the other, then this is sensed by a gear mechanism which is attached to the two counter-rotating shafts and which moves a control shaft or rotor 5 to equalize the load on the propellers. In the particular embodiment shown herein the load is equalized by changing the pitch of one of the propellers.

U.S. Pat. No. 2,228,638 (Mercier) shows a gear drive system for counter-rotating propellers where the load shared by the propellers is equalized due to the action of the gear system. In one arrangement, there are two planetary gear systems coaxially mounted and spaced axially from one another with the drive shaft driving the planet gears of a first planetary system, with these planetary gears in turn driving a ring gear to rotate the first propeller, and also rotating the sun gear of the second planetary system which in turn delivers power to the planet gears of a second planetary system. The planet gears of the second planetary system are fixed to stationary structure and the ring gear of the second planetary system is connected to the second propeller.

U.S. Pat. No. 2,455,239 (Doussein) shows a device for regulating the pitch of two counter rotating coaxial propellers in a manner that the torque on each propeller is equal to that on the other. There are two drive shafts which are connected to their respective propellers through elastic devices which are in turn connected to an electrical differential relay. The differential relay in turn controls an electromagnetic clutch arrangement provided between the pitch control device and one of the propellers. Thus, the load on the two propellers remains equal.

U.S. Pat. No. 2,533,346 (Brady, et al) shows a dual rotating propeller system where the propellers each have their pitch varied by means of a single power source. A particular gear trained to accomplish the variable pitch function is described.

U.S. Pat. No. 2,584,115 (Dinsmoor) shows a torque equalizing mechanism for counter rotating propellers where the pitch of the blades of one propeller is automatically adjusted in a direction to equalize the torque on the propellers in response to a difference in the speeds of the propellers. This is done by means of a speed-changing shaft positioned within the propeller shafts to change the propeller pitch.

U.S. Pat. No. 2,607,430 (Dean) relates to fans used in conjuction with aircraft propellers. The fan blades are variable in pitch so that the effect of the fan may be changed in accordance with airplane speed or fan speed conditions, and a mechanism is provided which permits the fan blades to be changed in pitch coincidentally with the changes in pitch of the propeller blades.

U.S. Pat. No. 2,674,407 (Ostrognai) describes what is called "a free air fan." There is a primary fan having a set of blades of a fixed pitch and a secondary fan having a set of blades at a different pitch mounted on the same axis as the primary fan. The blades of the primary fan are set at a pitch to draw air toward the blades of the secondary fan, and the blades of the secondary fan throw the air in the desired direction, depending upon the angle of set or pitch. By different relative angles or pitch of the blades of the primary and secondary fans, a choice in the cone or pattern of air flow of the fan may be obtained, varying from a narrow axial stream to a wide radial flow.

U.S. Pat. No. 2,982,361 (Rosen) discloses a propeller where there are two banks of blades with each blade of one bank cooperating with the blade of the next bank so as to form together cooperating elements of one effective air foil for takeoff and two separate air foil elements for cruise.

U.S. Pat. No. 3,830,587 (Shipes, et al) shows an axial flow fan assembly for use in air coolers and other industrial environments. This is a series fan assembly in which the fan stages are mounted closely together, and the blades of the downstream fan have a greater average pitch angle than the blades of the upstream fan.

U.S. Pat. No. 3,986,794 (Korn) shows a reversible ducted fan assembly where each of the blades or air foils of the fan have first and second portions which are rotatably supported from the fan hub and are moveable from a forward thrust position when the trailing edge of the first portion is positioned adjacent to the leading edge of the second portion to a reverse thrust position wherein the first and second portions are both rotated so as to locate the leading edge of the first portion adjacent to the trailing edge of the second portion. The effect is to form sets of blades or air foils which have a thrust reversing position.

U.S. Pat. No. 4,483,658 (Levine) shows a system where there are co-rotating sets of blades, positioned with one set in front of the other, these being arranged so that wake interceptions for a variety of relative velocities and blade spacing are arranged to provide acoustic and/or efficiency benefits.

U.S. Pat. No. 4,486,146 (Campion) shows a propeller arrangement where there is a propeller fan 27 which operates at a high-disc loading so that a substantial component of swirl is imparted to the slip stream. There is a multi-bladed stator which imparts a component of swirl in an opposite direction so that the total swirl imparted to the slip stream is nil or relatively low.

U.S. Pat. No. 4,621,978 (Stuart) shows a counter-rotating power turbine. This patent is directed particularly to the manner in which the rotating components are mounted.

SUMMARY OF THE INVENTION

The present invention relates to a system and method for creating thrust reversal from a counter rotating propeller assembly where there is a forward set and a rear set of propellers positioned adjacent to one another in general axial alignment with each other. The present invention is particularly suited for use in conjunction with an airplane engine, and more particularly with an engine having separate free turbines, or having inner and outer portions of a statorless turbine, driving the two rotors of a counter-rotating propeller, or having a gearbox not constraining the two rotor speeds to a fixed relation, so that substantially equal loading of the propeller set is desirable, and overspeed of any particular propeller set is to be avoided.

In normal flight, the two sets of propeller blades are set at a positive angle of attack to create forward thrust. For thrust reversal, the forward set continues to operate at a positive angle of attack, but the rear set operates at a negative angle of attack so that a net rearward thrust is created. Most specifically, the first set of propeller blades rotate about a first propeller axis in a first rotational direction with a first rotational velocity, and with pitch of the first propeller blades being set at a first pitch setting, relative to said first rotational velocity and said forward velocity, so that said first blades have a positive angle of attack to produce a forward thrust. The second set of propeller blades is rotated about a second propeller axis in a second opposite rotational direction with a second rotational velocity component, with pitch of the second propeller blades being set at a second pitch setting, relative to said second rotational velocity component and said forward velocity component, so that said second blades have a negative angle of attack to produce a reverse thrust, with said reverse thrust countering said forward thrust so as to produce a net reverse thrust component.

Desirably, the first rotational velocity of the first set of propeller blades is within about 10% of the second rotational velocity component of the second set of propeller blades, and more prefereably, within about 2%, with the most preferred arrangement being that the rotational velocity components are equal.

Also, it is desirable that the horsepower absorbed by the first blades is within about 20% of the horsepower absorbed by the second blades, and preferably within about 4%, with the most preferred arrangement being that the horsepower absorbed by the first and second set of blades is approximately equal.

Also, the preferred arrangement is that the pitch of the forward blades, relative to longitudinal alignment, is greater than the pitch of the rear blades, so that a ratio of a lateral force component produced by the forward blades to a forward force component produced by the forward blades is greater than a ratio of a lateral force component produced by the rear blades to a rear force component produced by the rear blades.

In a preferred configuration, the propeller blades are driven from a free turbine engine, where there are first and second free turbine portions connected to the first and second sets of propeller blades, respectively. Also, in the preferred form, the first and second axes of rotation of the first and second sets of blades are coincident with one another. Other features of the present invention will become apparent from the following detailed description.

In another embodiment the two sets of propeller blades are driven from a gear system where rotor speed of the two propeller sets are not contained in a fixed relation. More specifically, this gear system comprises a planetary drive transmission.

BRIEF DESCRIPTION OF THE DRAWING

FIG. 5 is a view similar to FIG. 3 showing a second embodiment for use in the present invention where the propeller blades are in a pusher configuration and are driven by a planetary gear transmission.

FIG. 6 is a view similar to FIG. 5 showing the engine in a tractor configuration with a planetary gear system; and FIG. 7 is an isometric view of a planetary gear transmission such as that used in the engine of FIGS. 5 and 6.

DESCRIPTION OF THE PREFERRED EMBODIMENT

Figure 1:
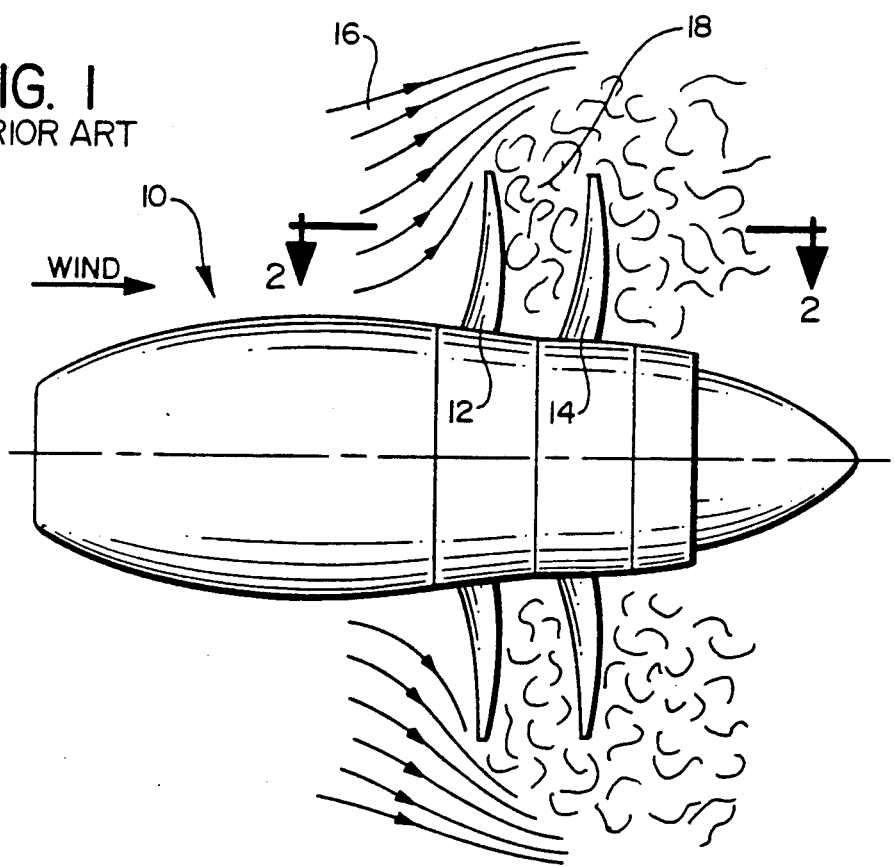
FIG. 1 is a side elevational view of a prior art power plant having forward and rear sets of counter-rotating blades operating in a prior art manner to achieve thrust reversal.

With reference to FIG. 1, there is shown a prior art engine having counter rotating propellers in a pusher configuration, with these propellers being operated in a prior art method of obtaining thrust reversal. More specifically, there is an engine 10 having forward and rear sets of variable pitch propeller blades 12 and 14 respectively, with the individual blades of both sets being set at a negative pitch for thrust reversal.

The effect on the air stream 16 is, as illustrated in FIG. 1, to divert the air stream in front of the forward blades 12 outwardly around the forward blades 12, so as to create a dead air region 18 behind the forward blades 12. The effect of this is that there is much greater power absorbtion by the front blades 12 than the rear blades 14. With a free turbine engine being used, the result is overspeeding of the rear propeller blades 14.

Figure 2:
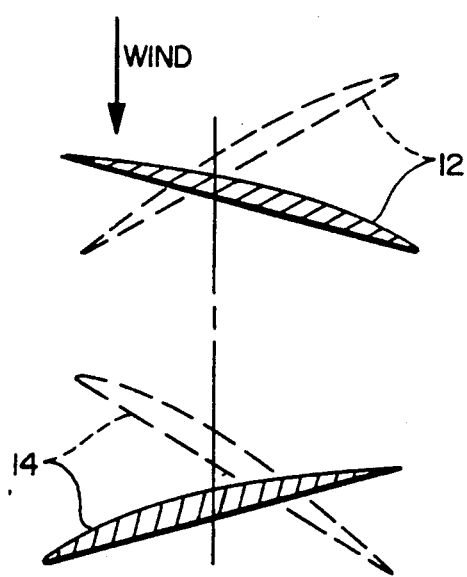
FIG. 2 is a sectional view taken along line 2—2 of FIG. 1, illustrating the positioning of a forward propeller blade and a rear propeller blade in the prior art thrust reversing mode of FIG. 1.

The same situation described above with reference to FIG. 1 is illustrated in FIG. 2 which is a view looking radially inwardly at a cross-section of a single forward blade 12 and a single rear blade 14. These blades 12 and 14 are shown in full lines in their thrust reversing positions (in accordance with the prior art method shown in FIG. 1) and for reference are shown in broken lines in their forward thrust positions where they have a positive pitch angle. This cross-sectional view is taken for typical blade configurations at a location near 75% of radius.

Figure 3:
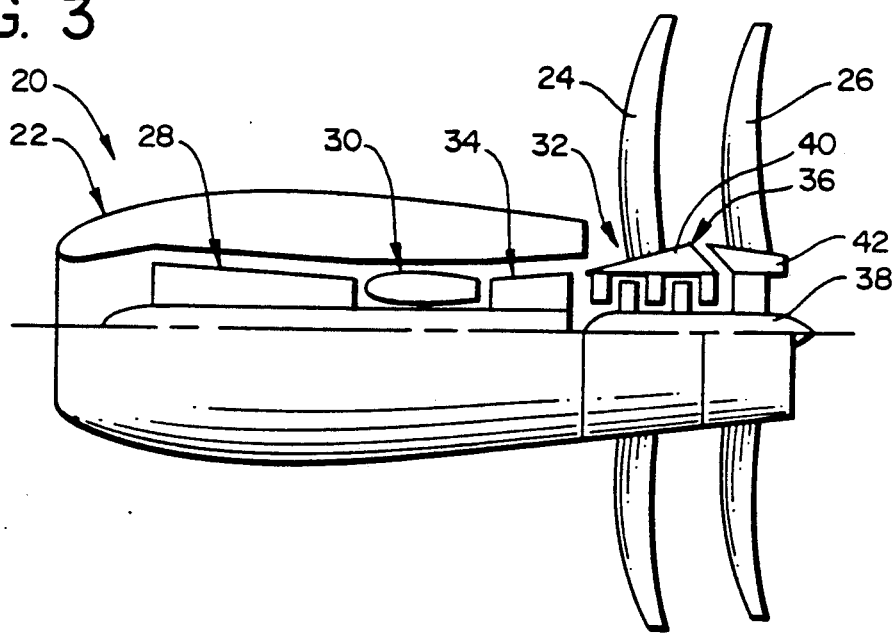
FIG. 3 is a longitudinal sectional view of a power plant with which the present invention can be practiced advantageously, this being a free turbine engine having forward and rear sets of propeller blades in a pusher configuration, mounted to respective freely rotating turbine sections.

The system and method of the present invention is intended to alleviate the problems described above with reference to FIGS. 1 and 2. Reference is made to FIG. 3, which shows in longitudinal sectional view a power plant 20 comprising a free turbine engine 22 having a forward and rear sets of counter rotating propeller blades 24 and 26, respectively. The free turbine engine 22 is, or may be, of itself of conventional design, and as shown herein, comprises a compressor section 28, a gas generating section 30 and a turbine section 32. With this being a free turbine engine, the turbine section has a forward turbine portion 34 which has a drive connection to the compressor section 28 so as to supply power thereto, and first and second free turbine portions 36 and 38, respectively. The first free turbine portion 36 is connected to the forward set of propeller blades 24, while the second free turbine portion 38 is connected to the rear set of turbine blades 26.

The two sets of propeller blades 24 and 26 are mounted to respective rotors 40 and 42, respectively, which are in turn connected to their respective free turbine portions 36 and 38. There is incorporated in each of the rotors 40 and 42 mechanisms to rotate each of the blades 24 and 26 about its respective lengthwise axis so that the pitch of the propeller blades 24 and 26 can be varied. Since such devices are well known in the prior art, these are not being shown in detail but are merely shown schematically as part of the rotors 40 and 42.

It should be understood that the power plant 20, including the free turbine engine 22 and its main components 24 through 38, can be of a prior art configuration.

Figure 4:
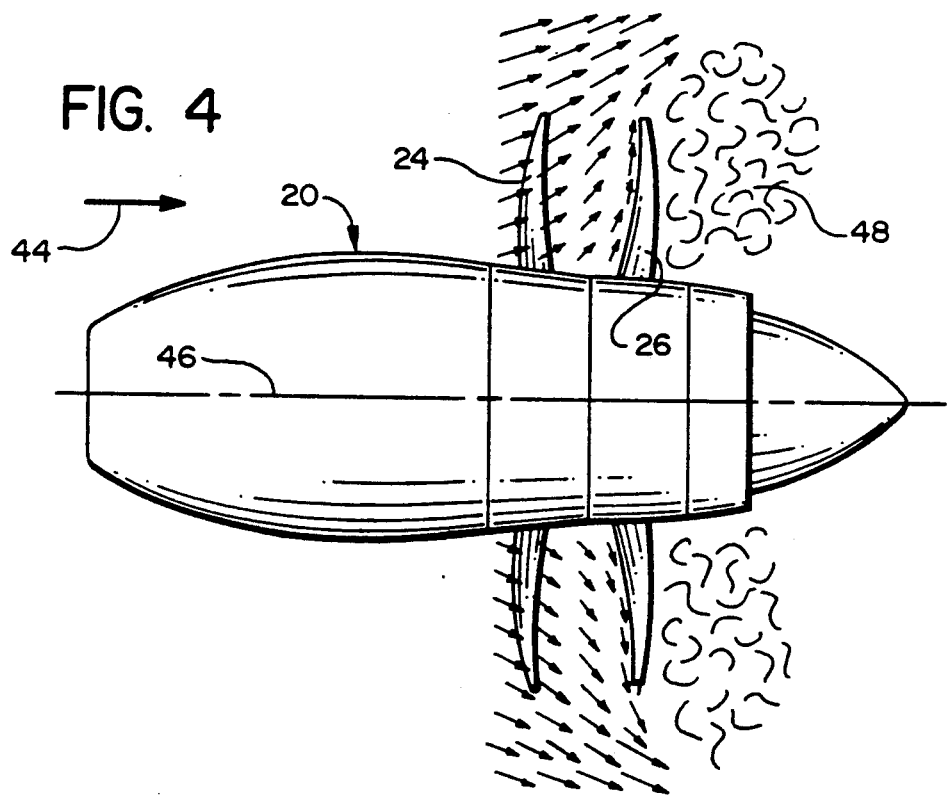
FIG. 4 is a view similar to FIG. 1, but showing a thrust reversing mode of operation of the present invention.

Reference is now made to FIG. 4 to illustrate the manner in which thrust reversal is accomplished in accordance with the teachings of the present invention. Let it be assummed that the aircraft to which the power plant 20 is mounted is moving forwardly in a situation where thrust reversal is desired (e.g. in landing), and that the direction of the wind, relative to the power plant 20, is indicated by the arrow 44, in a rearward direction. Both the forward and rear sets of propeller blades 24 and 26 are rotating about the common longitudinal center axis 46 of the power plant 20.

To accomplish thrust reversal, the forward propeller blades 24 are maintained at a positive angle of attack so as to create a net forward thrust component on the propeller blades 24. The effect of this on the air stream is to produce an orderly high energy flow of air which moves rearwardly from the region of the forward propeller blades 24 to the rear propeller blades 26. The rear propeller blades 26 are set at a negative angle of attack so as to create a reverse thrust, with a dead air region 48 being located behind the rear blades 26.

The net effect is that the reverse thrust created by the rear propeller blades 26 is greater than the forward thrust created by the forward set of propellers 24 so that a net reverse thrust is created. Further, both sets of propeller blades 24 and 26 are absorbing power with the sets of propeller blades 24 and 26 rotating at approximately the same speed. Thus, proper thrust reversal is accomplished, and overspeeding of the rear set of propeller blades 26 is avoided.

The basic configuration on the power plant 20 used in the present invention can be substantially the same as prior art power plants, with some possible modifications to ensure that the power plant 20 can be operated effectively in the method of the present invention. For example, the rotors 40 and 42 to which the propeller blades 24 and 26 are mounted should be constructed and arranged to enable the blades 24 and 26 to rotate to the desired locations. Further, depending upon the control system used, some modifications may be required to either override the existing control system or possibly modify the same. For example, the system may be provided with means to change the pitch of the propellers 24 and 26 automatically so that the rotational speed of the two sets of propellers 24 and 26 remains substantially the same. However, when the rear set of blades 26 is being moved to the thrust reversing position so as to have a negative angle of attack, it will be necessary for these blades 26 to pass through the zero angle of attack position, and thus experience some temporary overspeed. Thus, the control system would have to be arranged to allow for this. This control system could, of course, be simply computerized so that the appropriate commands are directed into the operating components.

FIG. 5 shows another engine configuration in which the method and system of the present invention can be advantageously used. There is a power plant 20a comprising a turbine engine 22a, having forward and rear sets of counter-rotating propeller blades 24a and 26a. The engine comprises a compressor section 28a, a gas generating section 30a and a turbine section 32a. The turbine section has a forward turbine portion 34a which has a drive connection to the compressor section 28a so as to supply power thereto, and a power turbine section 36a. The power turbine section 36a in turn connects to a planetary transmission 90. More specifically, the power turbine section 36a drives a sun gear 92. The planet gears 94 are connected (as shown at 98) to the rear propeller blades 26a, while the ring gear 96 is connected to the foward propeller blades 24a. It is apparent that as the sun gear 92 rotates, with the two sets of propeller blades 24a and 26a being aerodynamically loaded, there will be counter-rotation of the propeller blade sets 24a and 26a.

In FIG. 6, there is shown another power plant which can advantageously be used with the present invention. This power plant of FIG. 6 is substantially the same type of power plant as shown in FIG. 5, except that the propeller blades are in a tractor configuration. Accordingly, there will be no detailed description of the engine shown in FIG. 6, but light numerical designations will be given, with a "b" suffix distinguishing those of the engine in FIG. 6.

The system and method of the present invention are employed in connection with the power plants 20a and 20b shown in FIGS. 5 and 6 in the same manner as described previously here. More specifically, in the thrust reversal mode of operation, the blades are positioned as shown in FIG. 4, so that the two sets of blades 24a and 26a (or 24b and 26b) are equally loaded and rotate at the same speed.

It is to be recognized that various modifications could be made in the present invention, and the method of the present invention could advantageously be applied to power plant configurations differing from those specifically shown herein. For example, there could be a gear transmission which is not necessarily a planetary system, but one which does not constrain the two rotor speeds to fixed rates of rotation, so that substantially equal loading of the propeller sets is desirable, and overspeed of any particular propeller set is to be avoided.

It is to be recognized that various modifications could be made to the present invention without departing from the basic teachings thereof.

What is claimed is:

1. A method of operating an airplane engine to create reverse thrust where the engine has a counter rotating propeller assembly where there is a forward first set of first variable pitch propeller blades mounted for rotation on a first longitudinally aligned propeller axis, and a rear second set of second variable pitch propeller blades positioned behind, and adjacent to, said first set of propeller blades, and mounted for rotation about a second longitudinally aligned center propeller axis, under circumstances where said assembly is traveling in a forward direction at a forward velocity relative to ambient air, said method comprising:
   a. rotating said first set of first propeller blades about said first propeller axis in a first rotational direction with a first rotational velocity, and with pitch of the first propeller blades being set at a first pitch setting, a relative to said first rotational velocity and said forward velocity, so that said first blades have a positive angle of attack to produce a forward thrust;
   b. rotating said second set of second propeller blades about said second propeller axis in a second opposite rotational direction with a second rotational velocity, with pitch of the second propeller blades being set at a second pitch setting, relative to said second rotational velocity, said first rotational velocity, and said forward velocity so that said second blades have a negative angle of attack to produce a reverse thrust, with said reverse thrust countering said forward thrust so as to produce a net reverse thrust component.

2. The method recited in claim 1 wherein said first rotational velocity is within about 10% of said second rotational velocity.

3. The method as recited in claim 2 wherein said first rotational velocity is within about 2% of said second rotational velocity.

4. The method as recited in claim 3 wherein said first rotational velocity is substantially the same as said second rotational velocity.

5. The method as recited in claim 1 wherein the first rotational velocity and the pitch of the first blades is arranged, relative to the second rotational velocity and the pitch of the second propeller blades so that horsepower absorbed by said first blades is within about 20% of horsepower absorbed by said second propeller blades.

6. The method as recited in claim 1 wherein the first rotational velocity and the pitch of the first blades is arranged, relative to the second rotational velocity and the pitch of the second propeller blades so that the horsepower absorbed by said first blades is within about 4% of horsepower absorbed by said second propeller blades.

7. The method as recited in claim 1 wherein the first rotational velocity and the pitch of the first blades is arranged, relative to the second rotational velocity and the pitch of the second propeller blades so that the horsepower absorbed by said first blades is substantially the same as that of the second propeller blades 8. The method as recited in claim 1 wherein the pitch of the forward blades is greater than the pitch of the rear blades, so that a ratio of a lateral force component produced by the forward blades to a forward force component produced by the forward blades is greater than a ratio of a lateral force component produced by the rear blades to a rear force component produced by the rear blades.

9. The method as recited in claim 8, wherein said engine is a free turbine engine, having first and second free turbine portions connected to, respectively, said first and second set of propeller blades.

10. The method as recited in claim 1, wherein said engine is a free turbine engine, having first and second free turbine portions connected to, respectively, said first and second set of propeller blades.

11. The method as recited in claim 1, wherein said engine has a gear transmission operatively connected to the first and second set of propeller blades where the gear transmission provides that the two rotor speeds are unconstrained with regard to any fixed relative rates of rotation.

12. The method as recited in claim 11, wherein said transmission is a planetary gear transmission.

13. The method recited in claim 1, wherein
   a. said first rotational velocity is within about 10% of said second rotational velocity;
   b. the first rotational velocity and the pitch of the first blades is arranged, relative to the second rotational velocity and the pitch of the second propeller blades so that horsepower absorbed by said first blades is within about 20% horsepower absorbed by said second propeller blades.

14. The method as recited in claim 13, wherein the pitch of the forward blades relative to said first axis is greater than the pitch of the rear blades relative to said second axis, so that a ratio of a lateral force component produced by the forward blades to a forward force component produced by the forward blades is greater than a ratio of a lateral force component produced by the rear blades to a rear force component produced by the rear blades.

15. The method as recited in claim 14, wherein said engine is a free turbine engine, having first and second free turbine portions connected to, respectively, said first and second set of propeller blades.

16. A method of producing reverse thrust in a fluid medium from a counter rotating propeller assembly where there is a forward first set of first propeller blades mounted for rotation on a first longitudinally aligned propeller axis, and a rear second set of variable pitch second propeller blades positioned behind, and adjacent to, said first set of propeller blades, and mounted for rotation about a second longitudinally aligned center propeller axis, under circumstances where said assembly is traveling in a forward direction relative to ambient air at a forward velocity, said method comprising:

a. rotating said first set of first propeller blades about said first propeller axis in a first rotational direction with a first rotational velocity, and with pitch of the first propeller blades being set at a first pitch setting, relative to said first rotational velocity and said forward velocity, so that said first blades have a positive angle of attack to produce a forward thrust;

b. rotating said second set of second propeller blades about said second propeller axis in a second opposite rotational direction with a second rotational velocity compound, with pitch of the second propeller blades being set at a second pitch setting, relative to said second rotational velocity component and said forward velocity, so that said second blades have a negative angle of attack to produce a reverse thrust, with said reverse thrust countering said forward thrust so as to produce a net reverse thrust component.

17. The method recited in claim 16 wherein said first rotational velocity is within about 10% of said second rotational velocity.

18. The method as recited in claim 17 wherein said first rotational velocity is substantially the same as said second rotational velocity.

19. The method as recited in claim 16 wherein the first rotational velocity and the pitch of the first blades is arranged, relative to the second rotational velocity and the pitch of the second propeller blades so that horsepower absorbed by said first blades is within about 20% of horsepower absorbed by said second propeller blades.

20. The method as recited in claim 16 wherein the first rotational velocity and the pitch of the first blades is arranged, relative to the second rotational velocity and the pitch of the second propeller blades so that the horsepower absorbed by said first blades is substantially the same as that of the second propeller blades.

21. The method as recited in claim 16 wherein the pitch of the forward blades relative to said first axis is greater than the pitch of the rear blades relative to said second axis, so that a ratio of a lateral force component produced by the forward blades to a forward force component produced by the forward blades is greater than a ratio of a lateral force component produced by the rear blades to a rear force component produced by the rear blades.

22. The method as recited in claim 16, wherein said first and second propeller blades are powered by an engine which is a free turbine engine, having first and second free turbine portions connected to, respectively, said first and second set of propeller blades.

23. The method recited in claim 16, wherein said first and second propellers are powered by an engine which has a gear transmission operatively connected to the first and second set of propeller blades where the gear transmission provides that the two rotor speeds are unconstrained with regard to any fixed relative rates of rotation.

24. The method as recited in claim 23 wherein said transmission is a plantetary gear transmission.

* * * * *